United States Patent
Muraishi et al.

(10) Patent No.: US 8,999,501 B2
(45) Date of Patent: Apr. 7, 2015

(54) URETHANE FOAM MEMBER, SEAL STRUCTURE, TONER STORAGE CONTAINER, PROCESS CARTRIDGE, IMAGE FORMING APPARATUS

(75) Inventors: Takaya Muraishi, Kanagawa (JP); Satoshi Hatori, Kanagawa (JP); Kaoru Yoshino, Tokyo (JP); Norio Yamagami, Tokyo (JP); Etsuo Kakizaki, Tokyo (JP)

(73) Assignees: Ricoh Company, Ltd, Tokyo (JP); Bridgestone Corporation, Tokyo (JP)

( * ) Notice: Subject to any disclaimer, the term of this patent is extended or adjusted under 35 U.S.C. 154(b) by 245 days.

(21) Appl. No.: 12/277,626

(22) Filed: Nov. 25, 2008

(65) Prior Publication Data

US 2009/0142574 A1    Jun. 4, 2009

(30) Foreign Application Priority Data

Nov. 30, 2007   (JP) ................................. 2007-311139
Oct. 30, 2008   (JP) ................................. 2008-279153

(51) Int. Cl.
*B32B 7/12* (2006.01)
*G03G 15/08* (2006.01)
*B32B 5/14* (2006.01)

(52) U.S. Cl.
CPC .............. *G03G 15/0886* (2013.01); *B32B 7/12* (2013.01); *B32B 5/14* (2013.01); *G03G 2215/0692* (2013.01); *G03G 15/0882* (2013.01); *G03G 15/0877* (2013.01)

(58) Field of Classification Search
USPC .............................................. 428/343, 318.6
See application file for complete search history.

(56) References Cited

U.S. PATENT DOCUMENTS

| | | | |
|---|---|---|---|
| 4,715,609 A * | 12/1987 | Mino et al. | 277/608 |
| 5,111,976 A | 5/1992 | Ban | |
| 6,564,479 B1 * | 5/2003 | Vickers | 37/233 |
| 2003/0173100 A1 * | 9/2003 | Flaherty et al. | 174/35 GC |
| 2005/0196199 A1 | 9/2005 | Hattori | |

FOREIGN PATENT DOCUMENTS

| | | |
|---|---|---|
| EP | 1890057 A1 | 2/2008 |
| JP | S61-140674 A | 6/1986 |
| JP | H03-258530 A | 11/1991 |
| JP | H04202391 A | 7/1992 |
| JP | 04268386 A * | 9/1992 |
| JP | H04-289869 A | 10/1992 |
| JP | H05320606 A | 12/1993 |
| JP | 10-312104 A | 11/1998 |

(Continued)

OTHER PUBLICATIONS

English Abstract of JP 04-268386, Tsumutoshi Sato, "Sealing Member", Sep. 24, 1992, 1 page.*

(Continued)

*Primary Examiner* — Hai Vo
(74) *Attorney, Agent, or Firm* — Sughrue Mion, PLLC

(57) ABSTRACT

A urethane foam member that after cutting into the desired shape from sheet urethane foam is applied with adhesive on one face of the urethane foam, an edge portion of the non-adhesive applied face at least at one side of the urethane foam member being of a low edge profile, to which permanent thermal distortion has been induced such that the thickness of the edge portion of the side is thinnest at the end portion thereof and the thickness gradually increases with distance from the end portion.

21 Claims, 17 Drawing Sheets

(56) References Cited

FOREIGN PATENT DOCUMENTS

| | | |
|---|---|---|
| JP | 11-109829 A | 4/1999 |
| JP | H11-218987 A | 8/1999 |
| JP | 2002-072653 A | 3/2002 |
| JP | 2002-341650 A | 11/2002 |
| JP | 2003-005501 A | 1/2003 |
| JP | 2003-66699 A | 3/2003 |
| JP | 2003-122114 A | 4/2003 |
| JP | 2004-226721 A | 8/2004 |
| JP | 2005-56430 A | 3/2005 |
| JP | 2006-342829 A | 12/2006 |
| JP | 2007-078902 A | 3/2007 |
| JP | 2007-226114 A | 9/2007 |

OTHER PUBLICATIONS

European Search Report dated Mar. 18, 2009.
Japanese Office Action issued Oct. 30, 2012 in JP Patent Application No. 2008-279153.
European Office Action dated Jan. 28, 2013 issued in EP Application No. 08253833.1-2216.
Japanese Office Action dated Jul. 9, 2013 issued in JP Patent Application No. 2008-279153.
Japanese Office Action dated Feb. 18, 2014, issued in corresponding Japanese Patent Application No. 2008-279153.

* cited by examiner

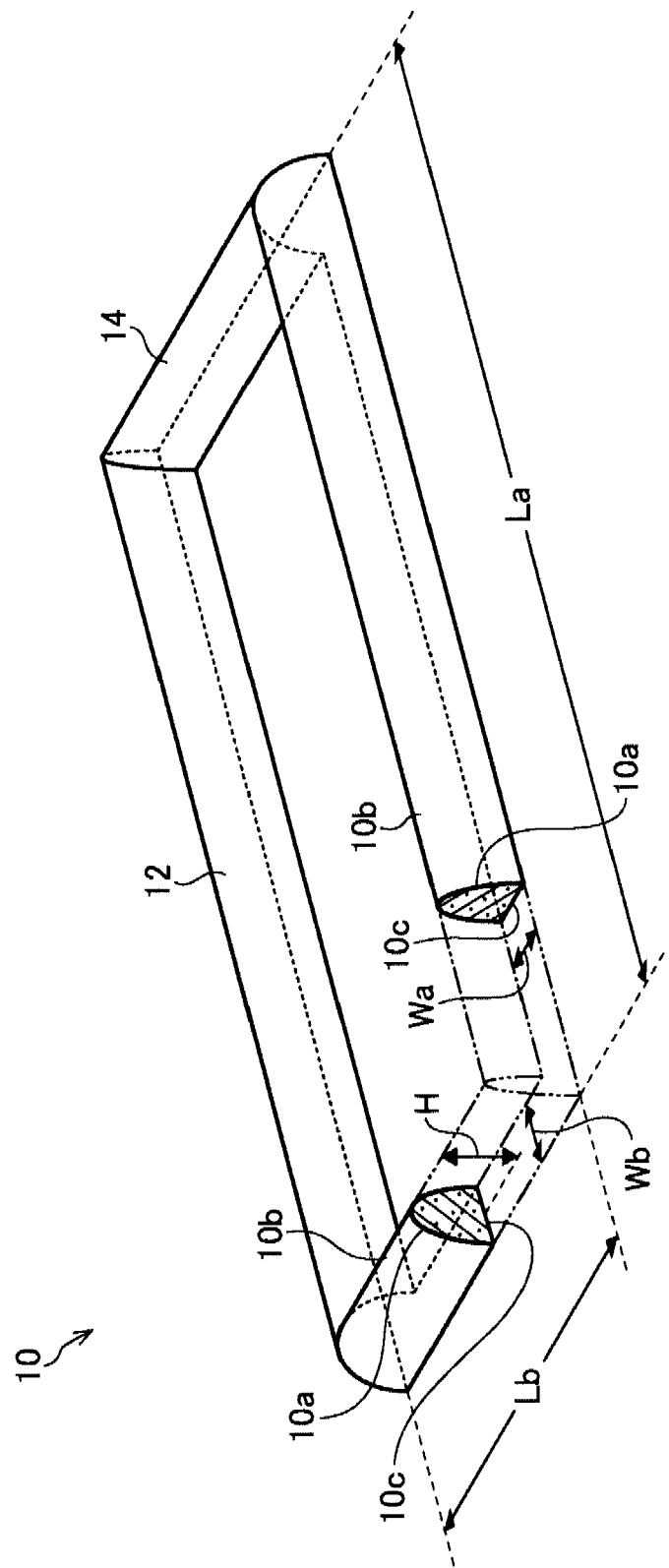

PRIOR ART

URETHANE FOAM MEMBER, SEAL STRUCTURE, TONER STORAGE CONTAINER, PROCESS CARTRIDGE, IMAGE FORMING APPARATUS

CROSS-REFERENCE TO RELATED APPLICATION

This application is based on and claims priority under 35 USC 119 from Japanese Patent Application Nos. 2007-311139, filed Nov. 30, 2007, and 2008-279153 filed Oct. 30, 2008.

BACKGROUND OF THE INVENTION

1. Field of the Invention

The present invention relates to a urethane foam member of a nonrigid urethane foam, and to a seal structure, a toner storage container, a process cartridge and an image forming apparatus using the same.

2. Description of the Related Art

Nonrigid urethane foam (referred to below when appropriate simply as urethane foam) is foamed to several tens to several hundred times in volume by gas generation during forming, to give a nonrigid, extremely soft urethane foam with an extremely small bulk density. Such urethane foam is consequently used in various cushioning materials and seal members. However, potions of such urethane foam that are pressed in a heat press undergo permanent distortion, and therefore the value of such urethane foams for seal members is even greater.

An example of a urethane foam member that has undergone heat pressing applied as a seal member is, for example, a seal structure used in toner storage containers for copiers. Such a seal structure surrounds the periphery of a toner outlet, for supplying toner stored in the toner storage container, and prevents toner from flying around (see Japanese Patent Application Laid-Open (JP-A) No. 07-056430).

A related heat press urethane foam member 201 is shown in FIG. 15. The urethane foam member 201 is a structure in which a urethane foam 202 is heat pressed over the entire surface thereof by two flat plate heat presses 211, 212, and then cut to the desired shape and size. Permanent distortion is induced by heat in the urethane foam member 201, and in addition a thin resin layer 210a is formed on the surfaces thereof by the heat. When the urethane foam member 201 is made into a product by cutting into the desire shape using a press cutter or the like there is always a cut face C formed. Consequently when, for example, a resin or metal shutter, roller or the like (represented by a shutter below) contacts the obtained cut product on the face and moves to the left or right, a problem has been noticed of the shutter catching on an edge E of the cut face C obtained when making the product.

With air ducts, used for airflow paths of copiers and the like in order to suppress the rising in temperature within the apparatus, there is generally a complicated disposition of ducts within the apparatus, and there are often ducts configured by connecting together plural air ducts. When this occurs seal structures with seal members using urethane foam are often used at the connection portions of the duct. In such cases structures arise during assembly where alignment is by sliding along toward the opening portion of the ducts, as well as structures where alignment is from a direction perpendicular to the opening portion of the duct.

FIG. 16A and FIG. 16B show the above described seal member 210 obtained from urethane foam as an example of a seal structure used in an air duct of a copier. A rectangular opening 5a is opened in a unit 5 that is detachable from a non-illustrated copier main body, the structure such that by sliding in the direction of the arrow the unit 5 can be mounted to and detached and from an air duct 6 provided to the copier main body. The above seal member 210 made from urethane foam is adhered around the periphery of the opening 5a.

When mounting, the face (cut face) along the thickness direction of the seal member 210 contacts the air duct first. Consequently the edge E of the seal member is sometimes lifted up.

An example of a seal structure, in which the air duct 6 is aligned from a direction perpendicular to the opening 5a, is shown in FIG. 17A and FIG. 17B. The urethane foam is compressed during mounting, deforming to the duct inside and the duct outside. There are cases in which the urethane foam sticks out, mainly at the cut face thereof (210x). Urethane foam members used between members that are frequently opened and closed, such as the front cover of a copier or the like, are likewise affected.

The common problem with the use of seal members made from urethane foam for such portions is that the cut face portions of the urethane foam become obstacles. In the present invention the seal member is one obtained by heat pressing urethane foam, and provides a seal member and a seal structure capable of suppressing catching on the edge thereof.

SUMMARY OF THE INVENTION

According to a first aspect of the invention, there is provided a urethane foam member that is cut into a desired shape from sheet urethane foam and includes adhesive applied on one face of the urethane foam. An edge portion of the non-adhesive applied face at least at one side of the urethane foam member is of a low edge profile, to which permanent thermal distortion has been induced such that the thickness of the edge portion of the side is thinnest at the end portion thereof and the thickness gradually increases with distance from the end portion. The urethane foam member of the first aspect has a low edge profile for an edge portion of the non-adhesive applied face at least at one side of the urethane foam member. The low edge profile is a profile to which permanent thermal distortion has been induced such that the thickness at the end portion is thinnest and the thickness gradually increases with distance from the end portion. Consequently, catching of a separate member against the low edge profile on the non-adhesive applied face of the urethane foam member can be suppressed. In the urethane foam member of the first aspect, by making two opposing sides with the low edge profile, catching of a separate member on both of the sides of the urethane foam member can be suppressed.

A second aspect of the present invention is a seal structure including a seal structure filling the gap between a member to which the urethane foam member of the first aspect has been adhered, and a separate member disposed by relative movement in a direction parallel to the face on which the urethane foam has been adhered, with the separate member contacting in the moving direction a thick portion configuring a portion of the edge portion where the thickness is thick.

In the seal structure of the second aspect the separate member contacts the thick portion configuring a portion of the edge portion where the thickness is thick, sealing between the member to which the urethane foam member of the first aspect has been adhered, and the separate member.

A third aspect of the present invention is a seal structure filling the gap between two members, a member to which the urethane foam member of the first aspect has been adhered, and a separate member contacted by moving from a direction perpendicular to the face on which the urethane foam has been adhered. The seal structure is one in which the urethane foam member has been adhered on such that the face in close contact with the separate member is a face of the urethane foam member to which no adhesive is applied.

The seal structure of the third aspect may also be configured such that the space between the member to which the urethane foam has been adhered and the separate member is capable of being opened and closed.

A fourth aspect of the present invention is a toner storage container for storing toner therein, provided with the urethane foam member of the first aspect adhered so as to surround the periphery of an outlet for letting toner out of the toner storage container.

A fifth aspect of the present invention is an image forming apparatus provided with the toner storage container of the fourth aspect.

A sixth aspect is an air duct for use in an image forming apparatus, provided with a connecting portion with the seal structure of the second aspect or the third aspect.

A seventh aspect of the present invention is an image forming apparatus provided with the air duct of the sixth aspect.

An eighth aspect of the present invention is a process cartridge that is attachable and detachable to and from an image forming apparatus, the process cartridge provided with the seal structure of the second aspect or the third aspect provided to at least one of an air inlet port and/or an air outlet port.

A ninth aspect of the present invention is an image forming apparatus provided with the process cartridge of the eighth aspect.

BRIEF DESCRIPTION OF THE DRAWINGS

Exemplary embodiments of the present invention will be described in detail based on the following figures, wherein:

FIG. 5 is a partial cut-away perspective view of a seal member of the present exemplary embodiment;

DETAILED DESCRIPTION OF THE INVENTION

Figure 1:
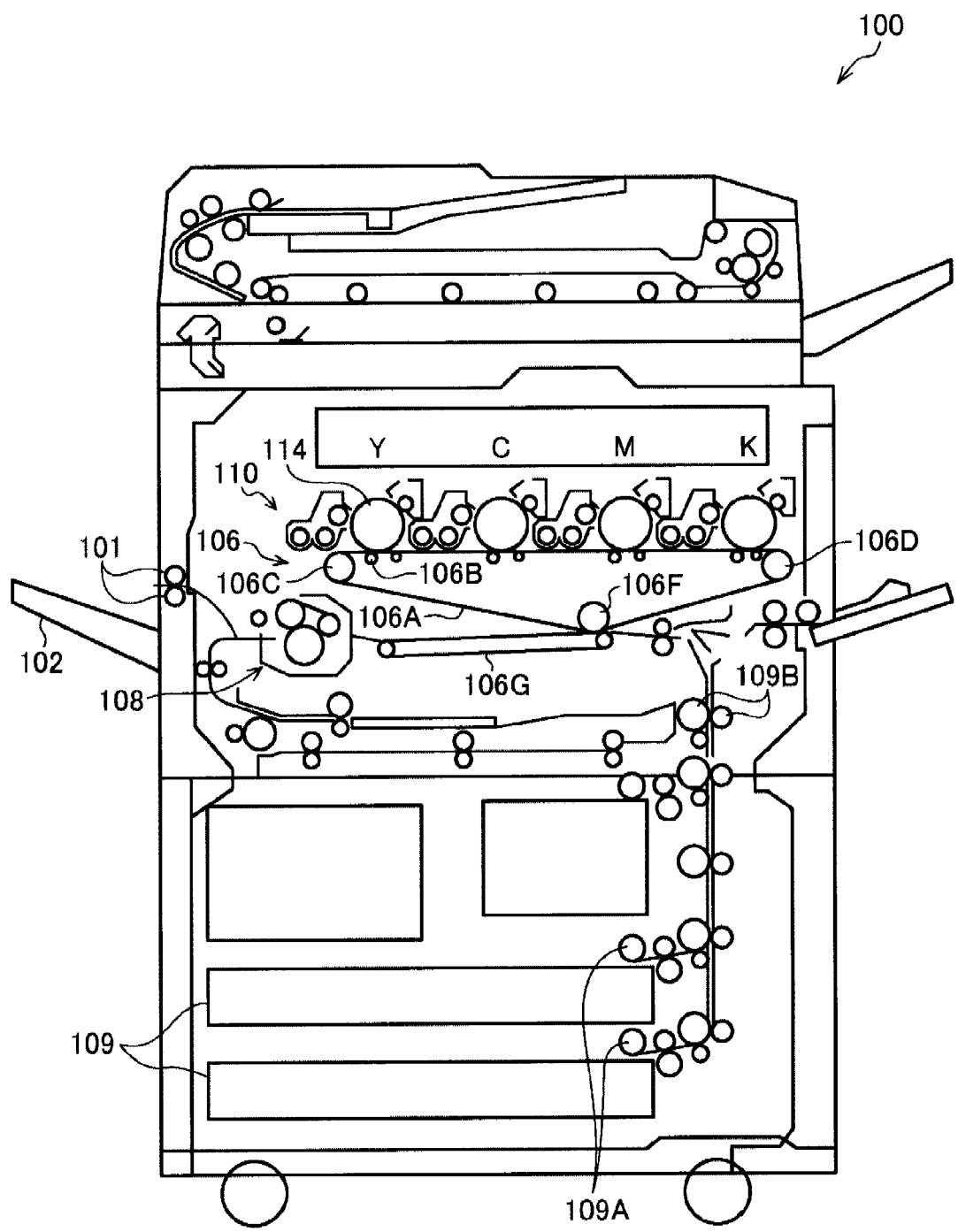
FIG. 1 is an overall schematic diagram of an image forming apparatus of the present exemplary embodiment.

Explanation has been given of related seal members, and the issue here is that there are configured with urethane having a cut face C. Due to this configuration, when during use a shutter or the like moves to the left or right above the face of the seal member, the shutter catches on the edge E of the cut face C. In the urethane foam member of the present invention there is no edge E of the cut face, and a seal structure utilizing this urethane foam member has the highly desirable feature of being able to suppress catching of a shutter or the like at this position.

The basic idea of the present invention is to compress urethane foam within a cavity formed by a pair of molds, and subject the urethane foam to permanent thermal deformation, and the present invention specifically provides a urethane foam member formed with the profile of the edge portion of the urethane foam formed into a curved surface.

More particularly, a first point of the present invention is the point that catching of the cut cross-section is prevented by thermal compression of the edge portion of the cross-section of the urethane foam. In addition, the thickness of the top face of the urethane foam cross-section end portion changes progressively from the end portions (inside and outside edges) toward the middle, and for example the strength against damage to the urethane foam is raised even in conditions where there is movement in a direction parallel to the adhesive applied face of the urethane foam.

The urethane foam member of the present invention is a seal member, for example a seal member formed in a ring shape for fitting around the periphery of an opening of a duct. The reference here to a ring shape means an endless shape, and includes circular shapes, elliptical shapes, rectangular shapes, etc.

A feature of a seal structure of the present invention is permanent deformation by thermal compression is induced in the end portion of the urethane foam member (seal member) that contacts a separate member when the urethane foam member, filling a gap between a urethane foam member-affixed member and the separate member, is contacted by the separate member moving relatively in a direction parallel to the urethane foam member-affixed face. Namely, the profile of the end portion of the urethane foam is formed by inducing permanent thermal deformation so that the thickness of the edge of the urethane foam is thinnest at the end portion, and gradually increases with distance from the end portion. By so doing the edge portion does not lift up and breaking up etc. of the urethane foam does not occur.

The specific gravity of the urethane foam used is from 0.02 to 0.1, with both ethyl urethane foams and ester urethane foams being usable therefor. There is no particular limitation to the thickness of the urethane foam for thermal compression, however, for example, for a seal member used in a toner storage container thermal compression distortion of urethane foam of 5 to 15 mm thickness down to 3 to 5 mm thickness is suitable. When carrying out thermal compression in such a case the mold temperature is about 180° C. to 210° C. for about 1.5 to 4 minutes.

It should be noted that the thickness of the portions compressed by the two molds to become resin portions depends on the thickness of the urethane foam for compression, however, the thickness is about 0.1 mm. This obviously is to be cut away from the urethane foam member (seal member), however configuration may be made in which parting is made with a cutter. In order to accomplish this, a projection is formed in the vicinity of the parting line in the mold (preferably along the parting line) and the urethane foam thereby adopts an even more compressed state when thermal compression distortion is carried out. Formation of a groove around the periphery of the resin portion after heat processing is thereby ensured, and parting is even more simply carried out with the groove by pulling the resin portion.

Overall Configuration of Image Forming Apparatus Explanation will now be given of an image forming apparatus according to an exemplary embodiment of the present invention. An image forming apparatus 100 of the present exemplary embodiment is shown in FIG. 1. The image forming apparatus 100 is an electrophotographic color copier for forming color images, and includes four process cartridges 110 corresponding to four colors YCMK disposed parallel to each other along the movement direction of a transfer belt 106A (referred to below as a "tandem-type").

A transfer unit 106 is configured with the transfer belt 106A, four primary transfer rollers 106B corresponding to each of the process cartridges 110, support rollers 106C, 106D, and a secondary transfer roller 106F etc. forming part of transfer paper conveying path. The transfer belt 106A is of an endless moving configuration entrained around the four primary transfer rollers 106B, the support rollers 106C, 106D and the secondary transfer roller 106F.

Toner images, using respective colors of the four colors of toner, on the process cartridges 110Y, 110C, 110M, and 110K are transferred onto the transfer belt 106A by electrostatic transfer so as to be superimposed on each other. Specifically, primary transfer rollers 106BY, 106BC, 106BM, 106BK are disposed at the portions of the back face of the transfer belt 106A contacting the photoreceptors 114Y, 114C, 114M, 114K of each of the process cartridges 110. Image transfer regions are formed by the portions of the transfer belt 106A pressed by the primary transfer rollers 106B and by photoreceptors 114. A positive polarity bias is applied to the primary transfer rollers 106B when the toner images on each of the photoreceptors 114Y, 114C, 114M, 114K are being transferred. A transfer electric field is thereby formed in each of the respective primary transfer regions and the toner images on each of the photoreceptors 114 of the process cartridges 110 are electrostatically adhered in sequence to the transfer belt 106A, so as to be transferred superimposed on each other.

The toner images are then conveyed to a secondary transfer nip where the secondary transfer roller 106F presses against a conveying belt 106G; and the toner images are transferred all at once onto transfer paper conveyed thereto with matching timing. A belt cleaning device may be provided at the periphery of the transfer belt 106A for removing any remaining toner on the surface thereof.

The transfer paper is stored within paper supply cassettes 109 and is conveyed to a pair of register rollers 109B by pick-up rollers 109A and the like. The toner images superimposed on the transfer belt 106A are transferred all at once onto the transfer paper at the secondary transfer nip.

The transfer paper is then conveyed to a fixing unit 108 by the conveying belt 106G. The toner images on the transfer paper are fixed to the transfer paper in the fixing unit 108 by heat and pressure. The transfer paper is then discharged from the image forming apparatus 100 by discharge paper rollers 101 and placed in a discharge paper tray 102.

In the present exemplary embodiment process cartridges are defined as being of a case configuration in which a photoreceptor and one or more process devices required for the image forming process (charging device, developer device, cleaning device) are integrated together, being configured so as to be attachable to and detachable from the image forming apparatus main body. In the example of process devices described later an example is shown in which all of the above described charging device, developing device and cleaning device are integrated together with a photoreceptor. However there is no limitation thereto, and process cartridges having later described air ducts provided to each charging device, developing device and cleaning device are included within the definition of process cartridges.

Configuration of the Process Cartridge

Figure 2:
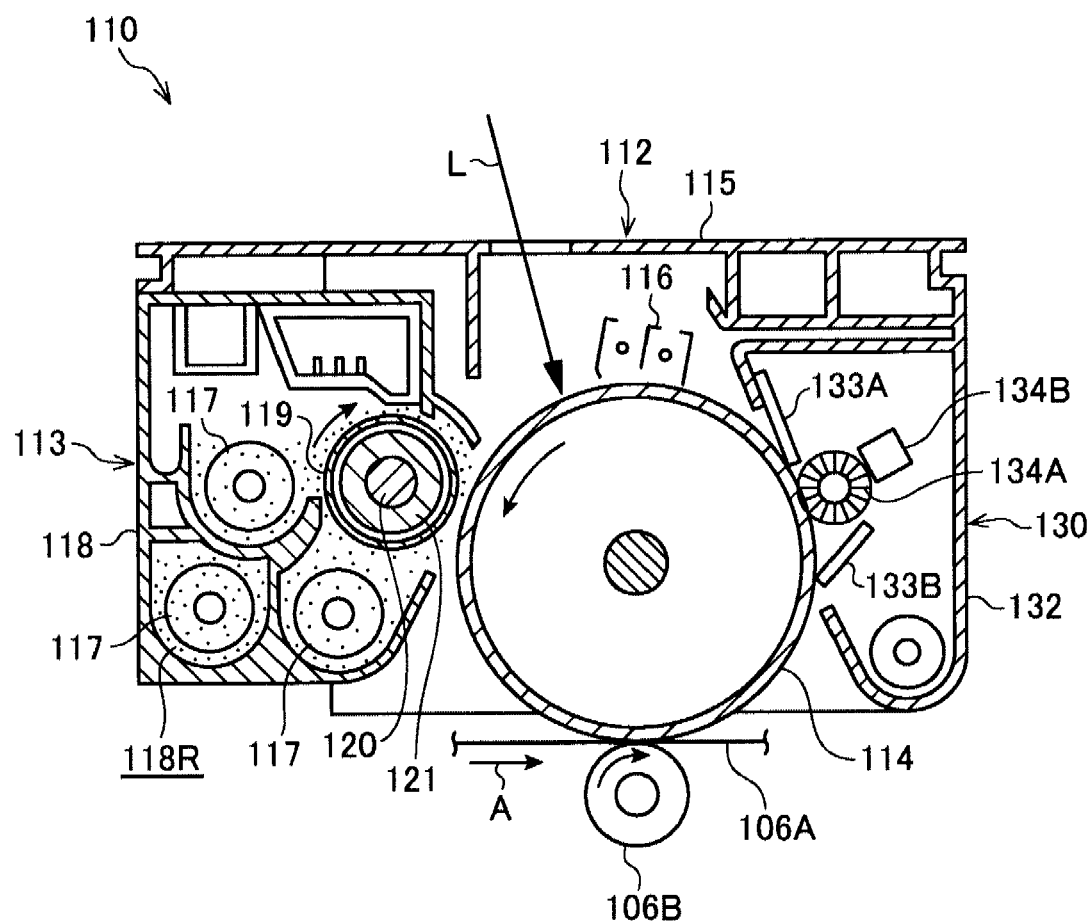
FIG. 2 is a cross-section of a process cartridge of the present exemplary embodiment.

A cross-sectional view of the process cartridge 110 mounted within the image forming apparatus 100 is shown in FIG. 2. The process cartridge 110 is provided with a photoreceptor unit 112 and a developing unit 113.

The photoreceptor unit 112 is provided with the photoreceptor 114 and a photoreceptor case 115 for accommodating the photoreceptor 114. An electrostatic charger 116 is also supported by the photoreceptor case 115, with the electrostatic charger 116 also being one of the elements of the photoreceptor unit 112 configuration.

The developing unit 113 is provided with a developer case 118 in which a dry developer D is stored, three conveying screws 117, and a developer roller 119 for holding and conveying the developer D thereon. There is a toner storage section 118R configured within the developer case 118, and the conveying screws 117 stir and convey the developer D inside the toner storage section 118R. A circular cylindrical shaped magnet 121 is disposed within the developer roller 119, fixed to a roller axis 120. Plural magnetic poles are formed in the circumferential direction of the magnet 121.

In the present exemplary embodiment a two component developer D is used, with a toner and a carrier, however a single component developer without a carrier may also be used. A magnetic developer is used in both cases.

A cleaning device 130 is integrally assembled to the photoreceptor unit 112 of the present exemplary embodiment. The cleaning device 130 is provided with: a cleaning case 132 configured from a portion of the photoreceptor case 115; a cleaning blade 133A, supported by the cleaning case 132 and press contacting the surface of the photoreceptor 114; a lubricant coating brush 134A, rotatably supported by the cleaning case 132 and contacting the surface of the photoreceptor 114: a blade 133B for making a uniform thin layer of the lubricant after coating: and a solid block of lubricant 134B press contacting the lubricant coating brush 134A for supplying lubricant to the lubricant coating brush 134A.

Explanation will be given of a configuration as described above in which the cleaning device 130 and the photoreceptor unit 112 are integrated together, however, configuration can be made in which the cleaning device and the photoreceptor unit are separate units, or a configuration in which the cleaning device is attachable and detachable from the photoreceptor unit.

When image forming operation is started the photoreceptor 114 is rotationally driven anti-clockwise, as shown in FIG. 2. When this occurs a voltage is applied to the electrostatic charger 116 and the surface of the photoreceptor 114 is thereby charged with a specific polarity. Writing light L is irradiated from a non-illustrated exposing device and scanned onto the charged surface of the photoreceptor 114, thereby forming a latent electrostatic image on the surface of the photoreceptor 114.

Developer D is held on the peripheral surface of the developer roller 119 by magnetic force of the magnet 121, and the developer D on the developer roller 119 is conveyed in the same direction as the rotational direction of the developer roller 119 by rotation of the developer roller 119 in the clockwise direction as shown in FIG. 2. The toner of the conveyed developer D electrostatically migrates to the latent image formed on the surface of the photoreceptor 114, and the latent image is thereby made visible. In the process cartridge 110 of the present exemplary embodiment the latent image formed on the surface of the photoreceptor 114 is made visible in this manner by the developer held and conveyed by the developer roller 119.

In the image forming apparatus 100 the primary transfer rollers 106B are rotatably supported, and the transfer belt 106A, serving as an example of a transfer member, is conveyed in the direction of arrow A between the clockwise rotating, as shown in FIG. 2, primary transfer rollers 106B and the photoreceptor 114.

A transfer bias is applied to the primary transfer rollers 106B as this occurs, and the toner image on the photoreceptor 114 is thereby transferred onto the transfer belt 106A. The toner images that have been transferred onto the transfer belt 106A are then conveyed to the secondary transfer nip where the secondary transfer roller 106F presses against the conveying belt 106G. The toner images on the transfer belt 106A are then transferred all at once onto the transfer paper at the secondary transfer nip. The transfer paper onto which the toner images have been transferred then passes through the fixing unit 108 and the toner images are then fixed to the transfer paper by the action of heat and pressure when passing through. The transfer paper that has passed through the fixing unit 108 is discharged into the discharge paper tray 102.

Any toner that did not transfer onto the transfer belt 106A and remains after transfer adhered to the photoreceptor 114 is removed from the photoreceptor 114 by the cleaning blade 133A of the cleaning device 130, and the photoreceptor 114 is initialized.

Configuration of the Toner Cartridge and Toner Hopper

Figure 3:
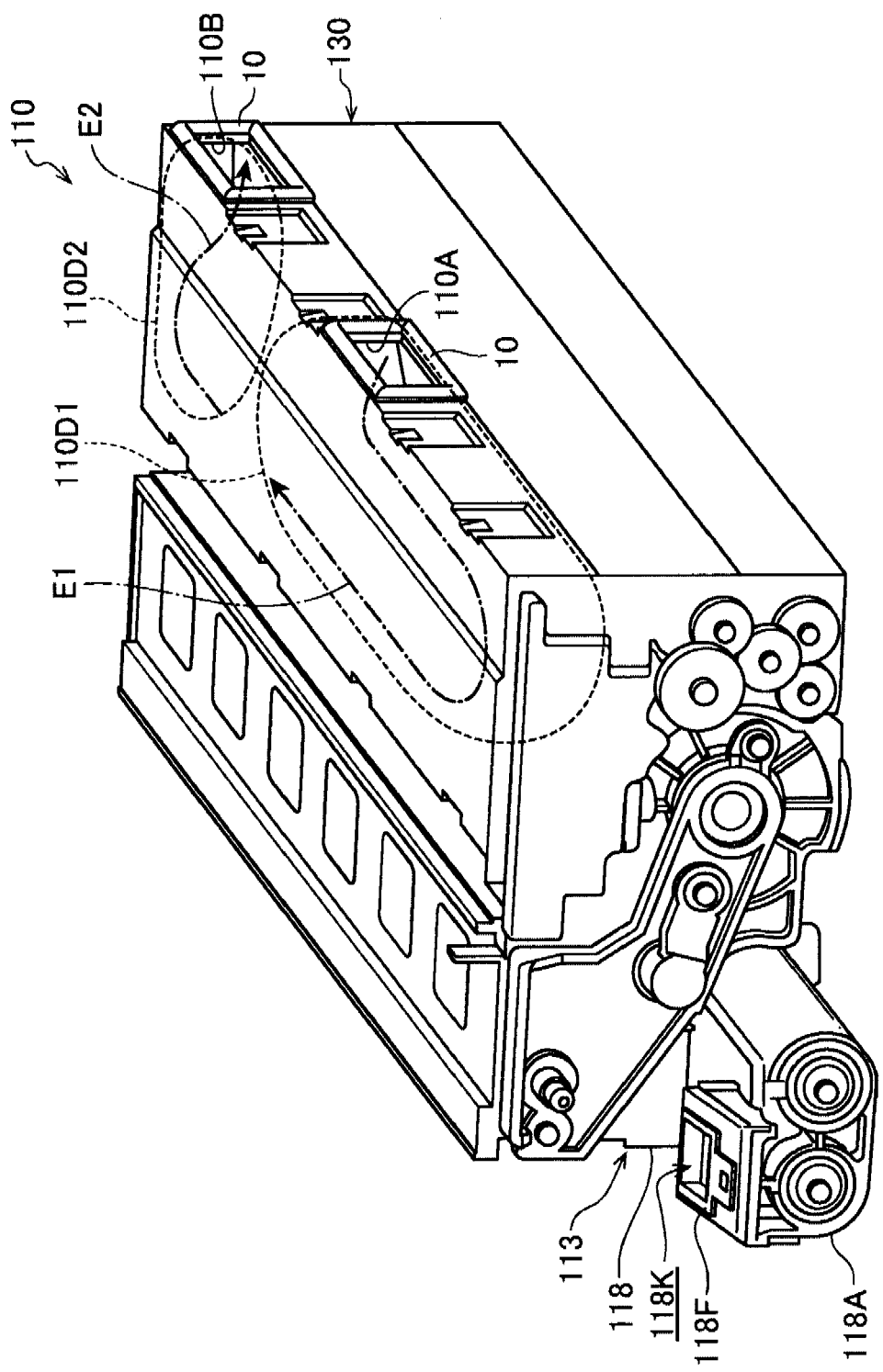
FIG. 3 is a perspective view of a process cartridge of the present exemplary embodiment.

As shown in FIG. 3, a portion configuring a projection 118A projects out from the end face at one side of the process cartridge 110, covering the ends of the two conveying screws 117 disposed next to each other at the lower side of the three conveying screws 117 in the developer case 118. An opening 118K serving as a toner refill inlet is configured at a top portion of the projection 118A, and the toner storage section 118R within the developer case 118 is in communication with a later described supply opening 147 of a toner hopper 140 through the opening 118K (see FIG. 4C). In FIG. 3 the opening 118K is closed off by a lid member 118F made from a urethane rubber.

Figure 4A:
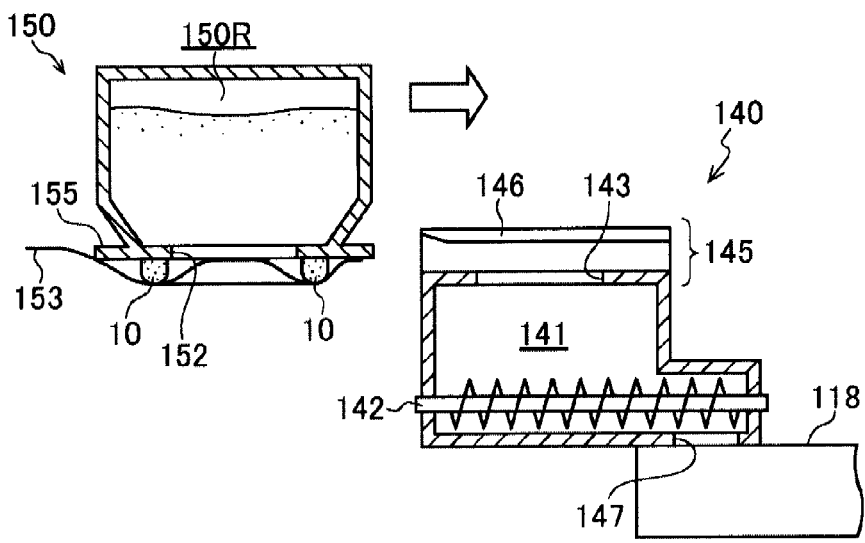
FIG. 4A to FIG. 4C are diagrams schematically showing connecting portions between a toner cartridge and a toner hopper according to the present exemplary embodiment.

As shown in FIG. 4A, the toner hopper 140 is internally fitted with a toner storage chamber 141 that temporarily accumulates toner therein and a hopper screw 142 that conveys the toner from the toner storage chamber 141 toward the opening 118K. A slot portion 145 is provided at the top face of the toner storage chamber 141 for sliding and setting a toner cartridge 150. The slot portion 145 is configured to include a setting guide 146 for guiding the toner cartridge and a toner receiving opening 143 for receiving toner. The toner receiving opening 143 is in communication with the later described discharge opening 152 of the toner cartridge 150. A supply opening 147, in communication with the opening 118K of the developer case 118, is configured at the opposite side of the toner hopper 140 to that of the toner receiving opening 143, with the toner storage chamber 141 of the toner hopper 140 interposed between the toner receiving opening 143 and the supply opening 147.

The toner cartridge 150 as an exemplary embodiment of a toner storage container of the present invention is configured with an internal toner storage space 150R for storing toner therein, and is also configured with the discharge opening 152 at a lower portion thereof. The discharge opening 152 is sealed with an encapsulation seal 153. A later described seal member 10 is adhered to the discharge opening 152 along the periphery of the discharge opening 152. A guide flange 155, for engaging with the setting guide 146 of the toner hopper 140, protrudes out from the sides at the bottom face of the toner cartridge 150.

Overall Structure of Seal Member

Explanation will now be given of the configuration of the seal member 10 used in the toner cartridge 150. As shown in FIG. 5, the seal member 10 is a rectangular frame shape provided with longitudinal portions 12 and crosswise portions 14. The seal member 10 is formed overall by thermal compression processing of urethane foam, with a longitudinal length La, a crosswise length Lb, a width of the longitudinal portions Wa, a width of the crosswise portions Wb, and a height H. The seal member 10 is protected by a skin layer 10a, formed over the entire surface during the thermal compression processing and having a comparatively high specific gravity. The apex of the seal member 10 is formed by a gentle curve shaped curved portion 10b. The opposite site to the curved portion 10b is configured with a flat plane shaped adhering surface 10c.

The curved portion 10b is configured along the length of the La direction longitudinal portions 12 so that the seal member 10 is thickest at the central portion in the width Wa direction, with the thickness gradually getting thinner on progression toward the end portions in the width Wa direction. The curved portion 10b is configured along the length of the Lb direction crosswise portions 14 so that the seal member 10 is thickest at the central portion, with the thickness gradually getting thinner on progression toward the end portions in the width Wb direction.

By configuring the seal member 10 as described above, the seal member 10 is able to move smoothly while the curved portion 10b contacts the top face of the toner hopper 140.

The seal member 10 is able to be adhered to the toner cartridge 150 by applying adhesive to the adhering surface 10c of the seal member 10 of FIG. 5.

Figure 4B:
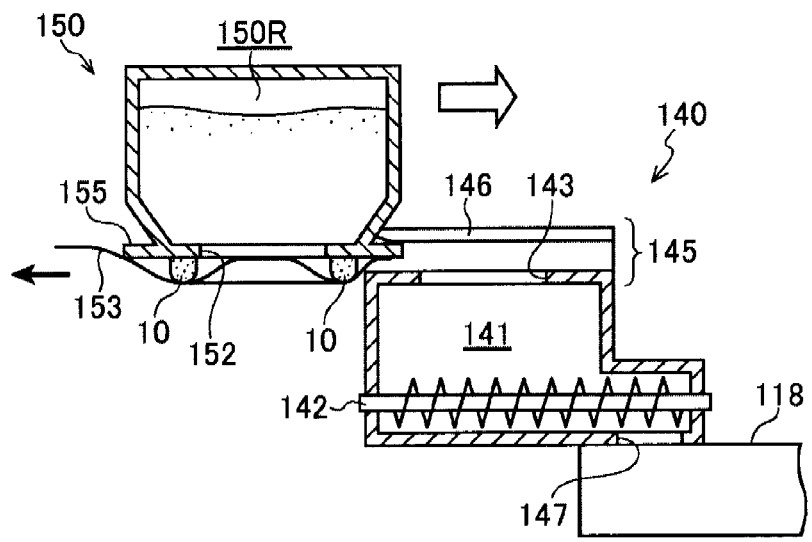
Figure 4C:
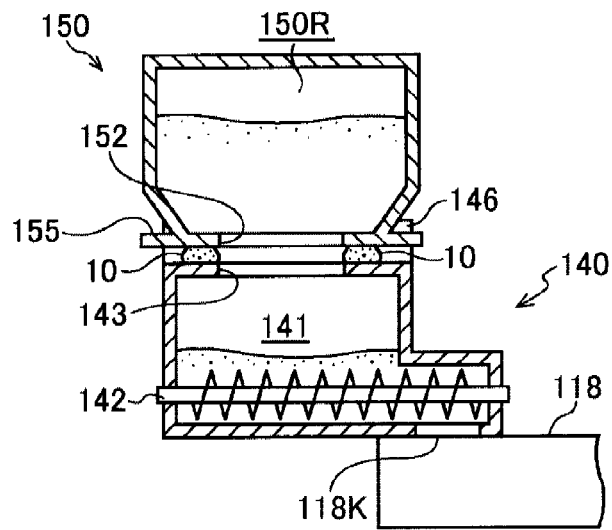

When the above described toner cartridge 150 is set to the toner hopper 140, as shown in FIG. 4B, the guide flange 155 of the toner cartridge 150 is set inside the setting guide 146 of the toner hopper 140 and positional alignment is carried out. The toner cartridge 150 is moved along the setting guide 146, namely along the ridge line of the curved portion 10b of the seal member 10, and the discharge opening 152 of the toner cartridge 150 is set so as to align with the toner receiving opening 143 of the toner hopper 140. When this occurs, as described before, the seal member 10 is provided with the curved portion 10b, therefore enabling a reduction in problems such as the end portions of the seal member 10 catching the setting guide 146 and being lifted up.

After completing setting of the toner cartridge 150, the encapsulation seal 153 is pulled out, and the toner within the toner cartridge 150 refills the toner hopper 140.

Modified Example of Toner Hopper

Explanation has been given above of an example in which the toner cartridge 150 is set to the toner hopper 140 by relative movement along the ridge line of the curved portion 10b of the seal member 10, however the toner cartridge 150 may be set by moving in a direction perpendicular to the top face of the toner hopper 140.

Figure 6A:
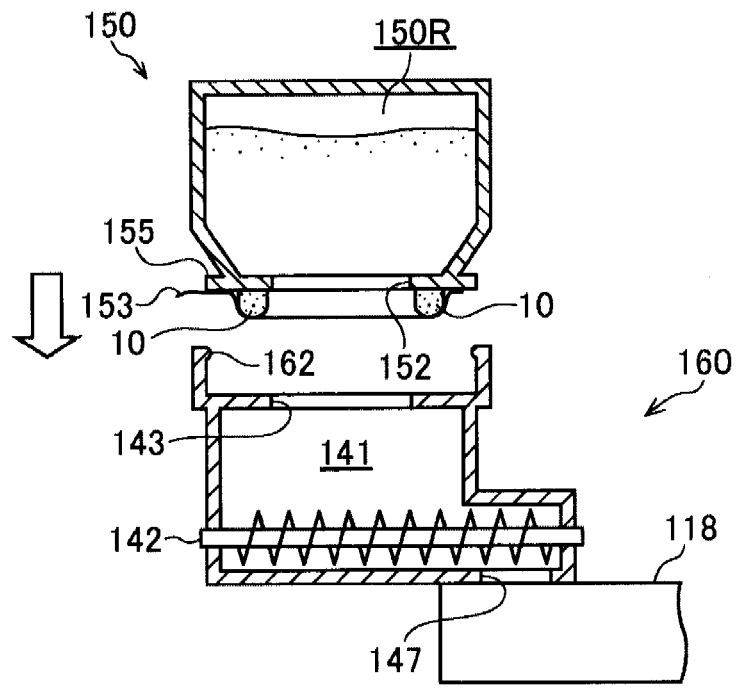
FIG. 6A and FIG. 6B are diagrams schematically showing a connecting portion of a toner cartridge and a toner hopper according to a modified example of the present exemplary embodiment.
Figure 6B:
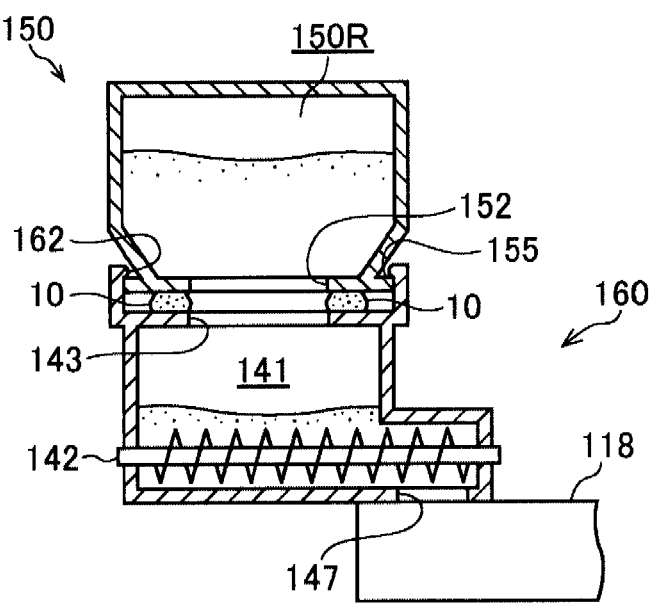

In such a case, as shown in FIG. 6A, a toner hopper 160 is provided with a snap-fitting portion 162, for fixing and retaining the guide flange 155 of the toner cartridge 150, so that the toner cartridge 150 can be held in a direction perpendicular to the toner receiving opening 143. When setting the toner cartridge 150 to the toner hopper 160, as shown in FIG. 6A, the toner cartridge 150 is moved from the perpendicular direction closer so as to face the toner hopper 160, and the guide flange 155 is engaged with the snap-fitting portion 162, and the discharge opening 152 of the toner cartridge 150 is set so as to align with the toner receiving opening 143 of the toner hopper 160 (see FIG. 6B). In such a case, as stated above, since the seal member 10 is provided with the curved portion 10b, the seal member 10 can be suppressed from sticking out to the outside in the width direction even though the seal member 10 is compressed against the top face of the toner hopper 160.

Configuration of Air Duct for Main Body of Image Forming Apparatus Use

Figure 7:
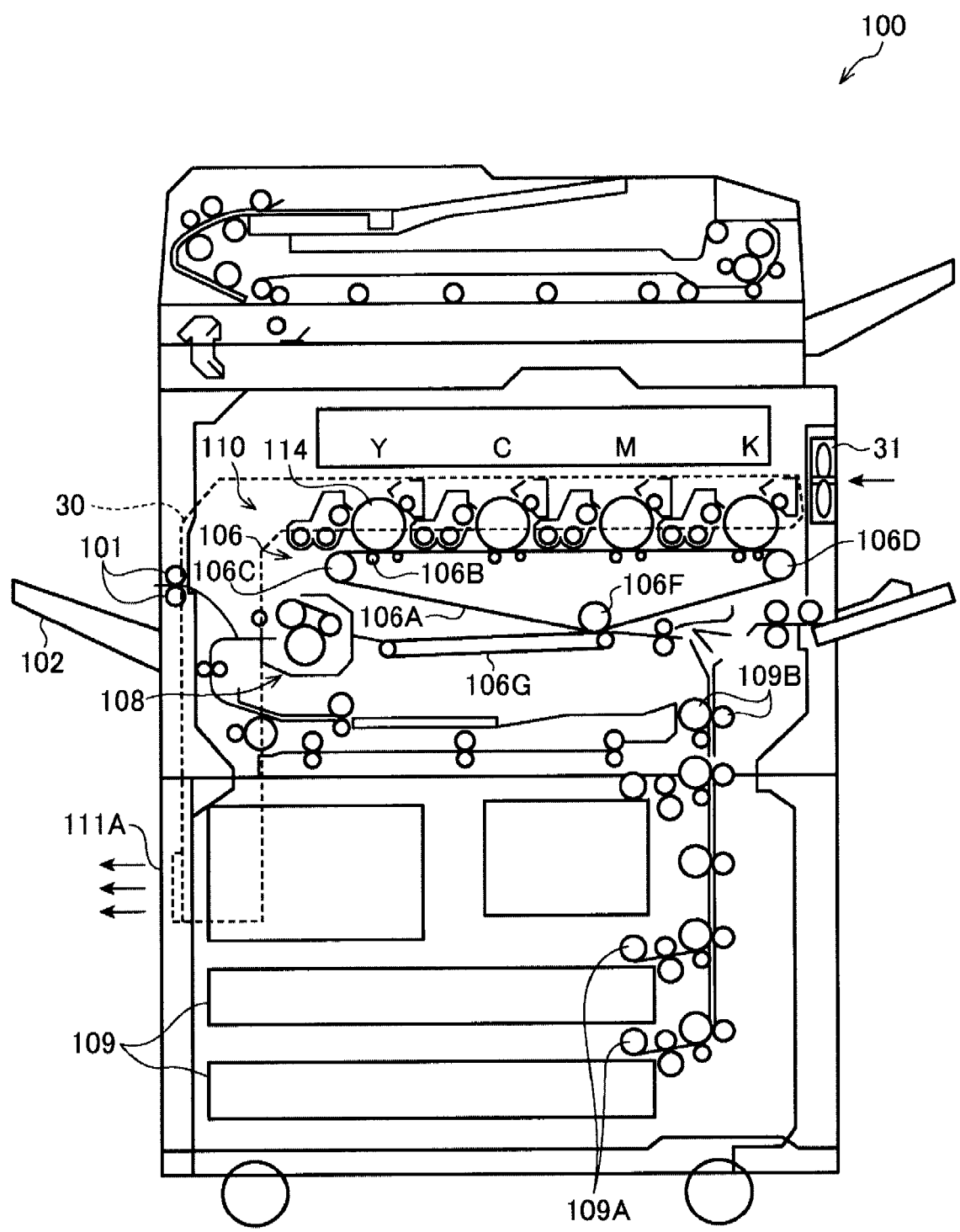
FIG. 7 is an overall schematic diagram of an image forming apparatus of the present exemplary embodiment.

As shown in FIG. 7, the previously explained image forming apparatus 100 has a main body air duct 30 provided therein, serving as an air duct of the present exemplary embodiment. The main body air duct 30 is provided extending to the apparatus back face of the image forming apparatus 100, and encloses an L shape.

A suction fan 31 is provided at the main body right face of the image forming apparatus 100 as shown in FIG. 7, for suctioning fresh air from outside into the main body air duct 30.

Figure 8:
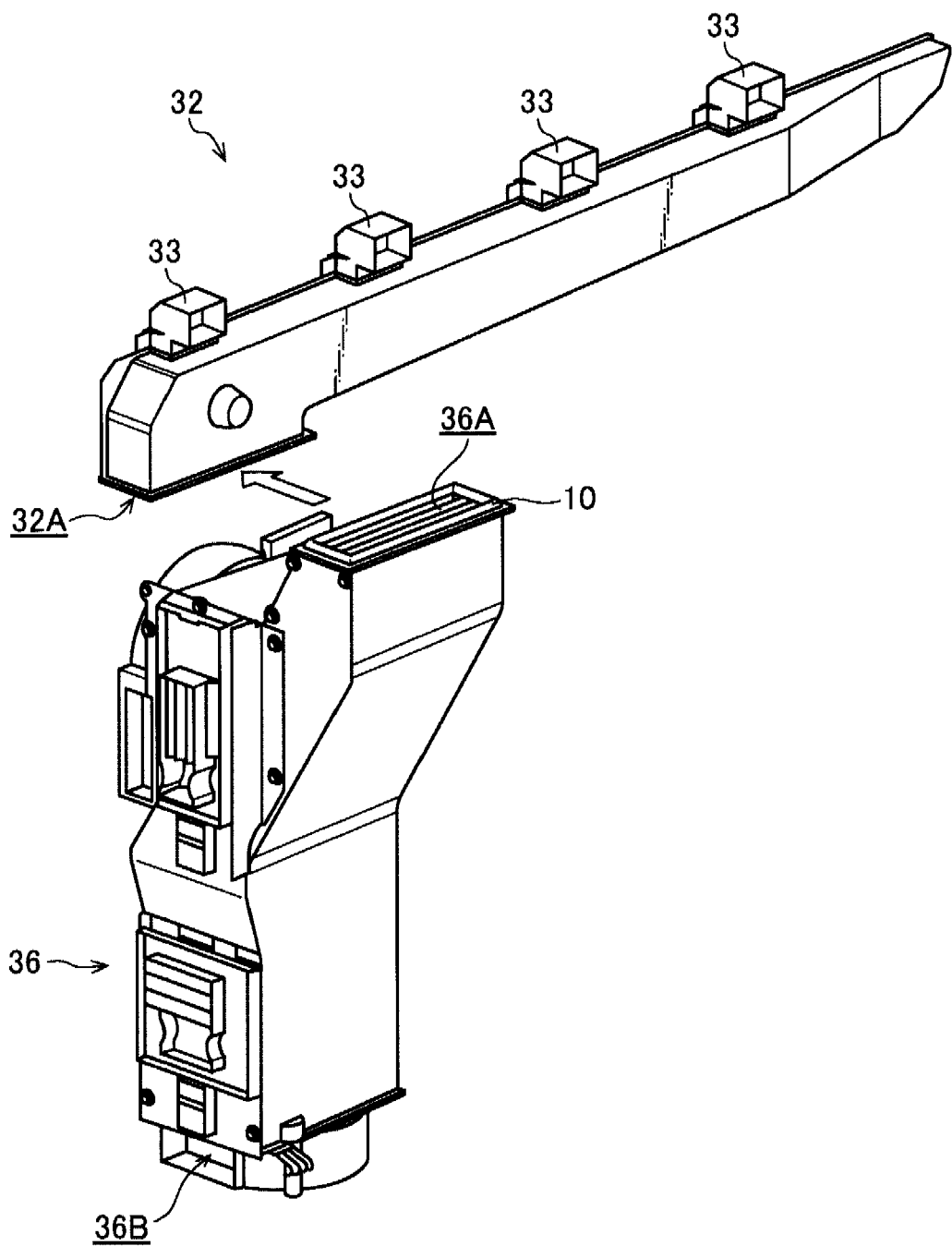
FIG. 8 is a perspective view showing an air duct provided to an image forming apparatus of the present exemplary embodiment, before connection.

The L-shaped main body air duct 30 is configured with a horizontal duct portion 32 and a vertical duct portion 36, as shown in FIG. 8. The horizontal duct portion 32 is disposed within the image forming apparatus 100 in a substantially horizontal direction. The horizontal duct portion 32 is provided with main body protrusion duct base fitting portions 33 at four locations corresponding to the positions of the side faces at the sides of the cleaning devices 130 of each of the process cartridges 110. Later described main body protrusion ducts 40 are connected to the main body protrusion duct base fitting portions 33. The horizontal duct portion 32 is configured at the side furthest from the suction fan 31, namely at the downstream side in the airflow direction, with a downward facing opening (downstream end opening 32A).

The vertical duct portion 36 is disposed within the image forming apparatus 100 along a substantially vertical direction. An upstream end opening 36A is configured to one end of the vertical duct portion 36, for connecting to the downstream end opening 32A of the horizontal duct portion 32. The upstream end opening 36A is of rectangular shape and the above described seal member 10 is adhered around the periphery of the upstream end opening 36A. The size of each of the seal members 10 is appropriately adjusted according to the sizes of the upstream end opening 36A. An exhaust opening 36B is configured at the other end of the vertical duct portion 36, for expelling air out from the image forming apparatus 100.

Figure 9:
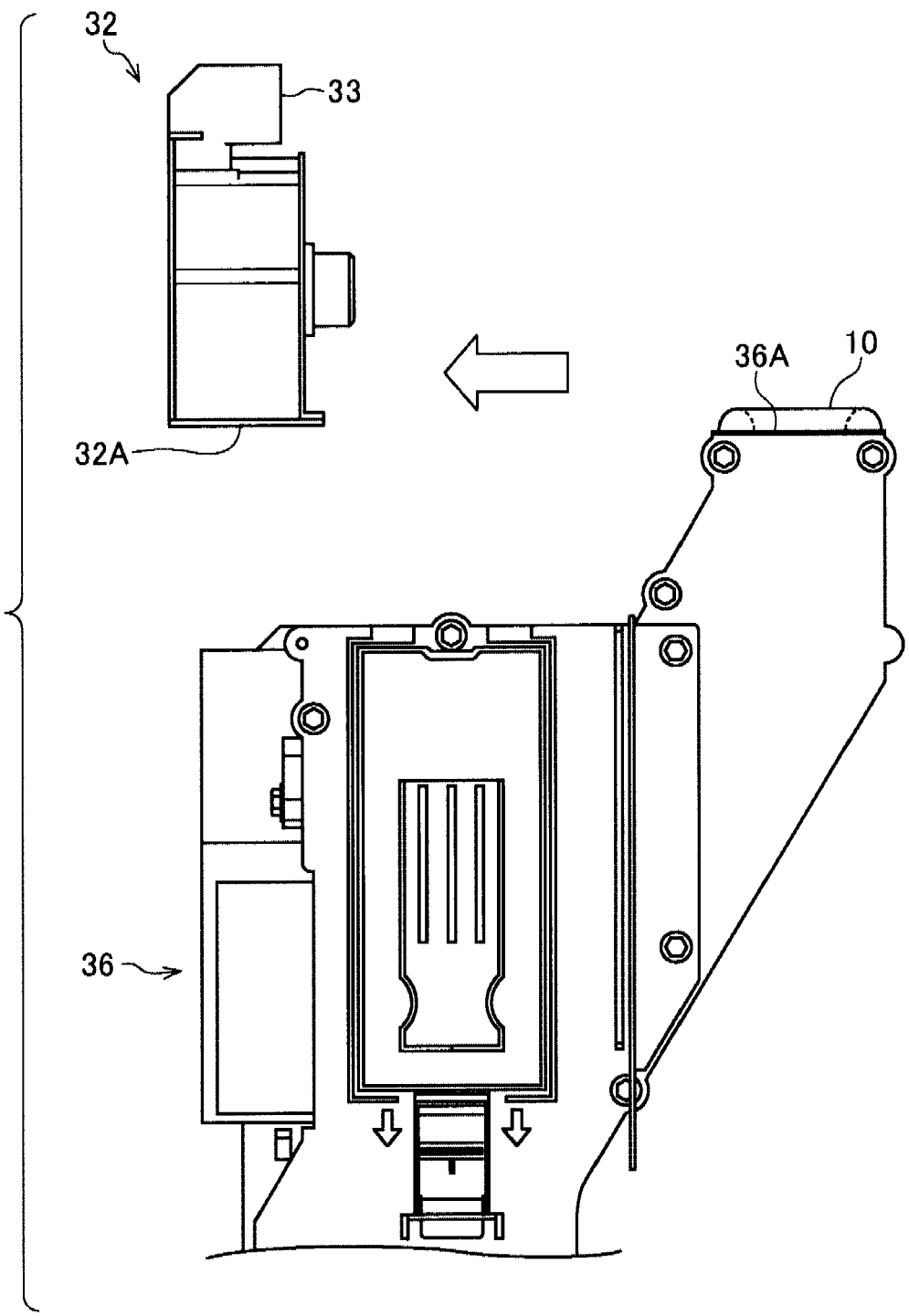
FIG. 9 is a side view showing an air duct provided to an image forming apparatus of the present exemplary embodiment, before connection.

The assembly of the main body air duct 30 involves first assembling the horizontal duct portion 32 to the image forming apparatus 100. Then, as shown in FIG. 9, the vertical duct portion 36 is moved so as to be in positional alignment with the downstream end opening 32A of the horizontal duct portion 32, and assembled so the seal member seal member 10 is in contact around the periphery of the downstream end opening 32A. The downstream end opening 32A of the horizontal duct portion 32 and the upstream end opening 36A of the vertical duct portion 36 are aligned in this manner to form a connection portion.

In the assembly process, since the vertical duct portion 36 is free right up to just before assembly with screws, it is possible to move the vertical duct portion 36 in any setting direction within a horizontal plane, or in the vertical direction, while the vertical duct portion 36 is in sliding contact against the periphery of the downstream end opening of the horizontal duct portion 32. The seal member 10 is adhered around the periphery of the upstream end opening 36A of the vertical duct portion 36, and the seal member 10 is configured with the curved portion 10b. Therefore when the vertical duct portion 36 is being assembled, problems such as the end portions being lifted up can be reduced by the action of suppressing catching of the seal member 10 by using the curved portion 10b, even when there is sliding frictional load applied to the seal member 10 from the horizontal duct portion 32.

Configuration of Air Duct Within Process Cartridge

Figure 10:
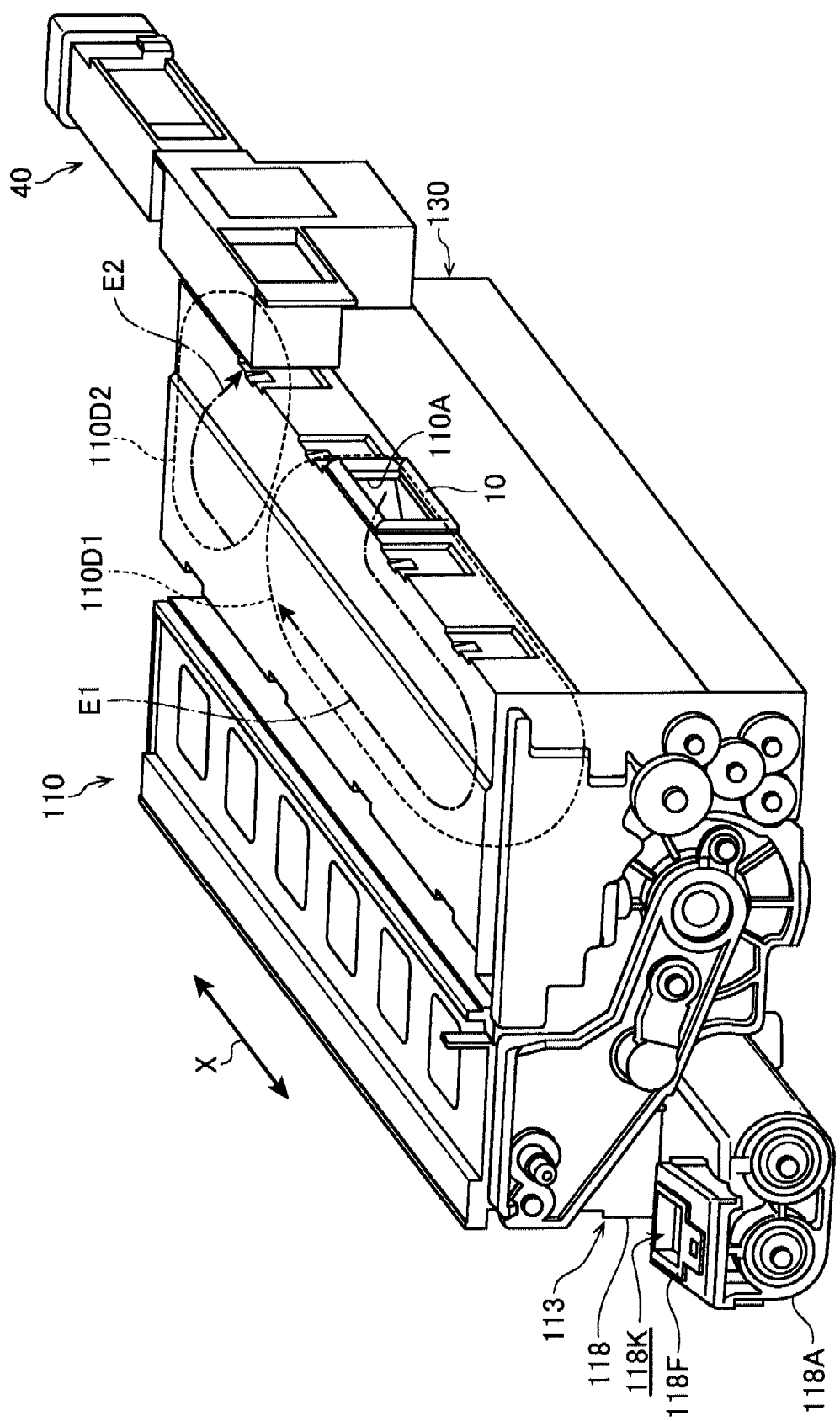
FIG. 10 is a perspective view of a process cartridge and a main-body protruding duct of the present exemplary embodiment.
Figure 11:
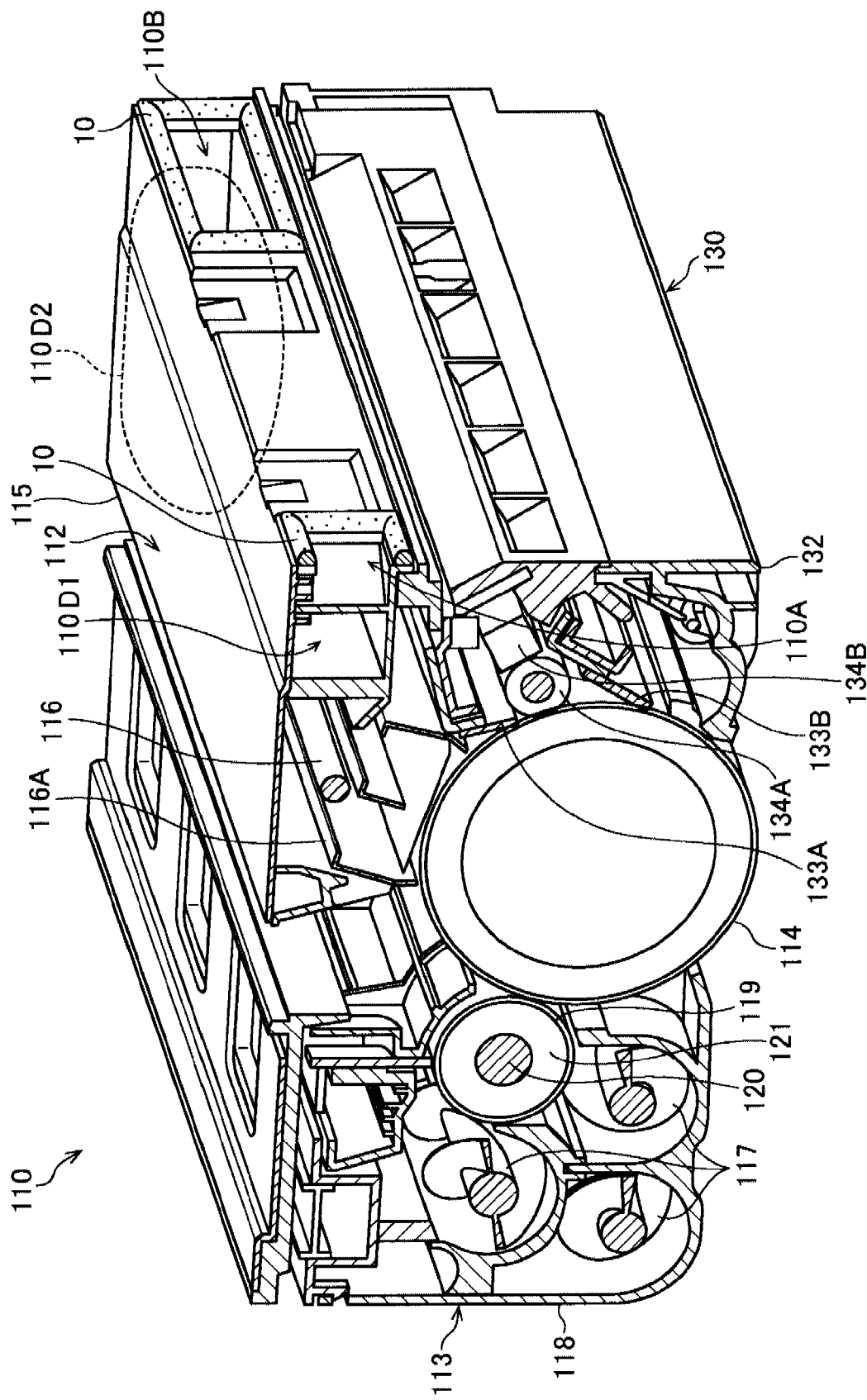
FIG. 11 is a partial cut-away perspective view of a process cartridge of the present exemplary embodiment.

The process cartridge 110 is configured with an air inlet port 110A and an air outlet port 110B, as shown in FIG. 10. The air inlet port 110A is configured at a central portion in the axial direction X of the process cartridge 110, and the air outlet port 110B is configured further in the axial direction X to the main body air duct 30 side than the air inlet port 110A.

Within the process cartridge 110 is configured a first process cartridge duct 110D1 that guides air from the air inlet port 110A, around the front as seen in FIG. 10 (the opening 118K side) to a casing 116A of the electrostatic charger 116, and a second process cartridge duct 110D2 through which air passes from the back side of the casing 116A as seen in FIG. 10 to the air outlet port 110B of the process cartridge 110. Airflow paths E1, E2 are thereby configured within the process cartridge 110, as shown in FIG. 3.

The process cartridge 110 is configured so as to move in the directions into and out of FIG. 1 and FIG. 7, enabling mounting to and detaching from the image forming apparatus 100. When the process cartridge 110 is mounted to the image forming apparatus 100 the air inlet port 110A and the air outlet port 110B connect with later described, non-illustrated, air outlet ports and air inlet ports of the main body protrusion duct 40.

The main body protrusion duct 40 is, as shown in FIG. 10, disposed in a horizontal direction of the main body air duct 30, and is provide so as to contact the side face on the cleaning device 130 side of the process cartridge 110. The main body protrusion duct 40 performs two actions at the same time, an action of blowing air into the process cartridge 110, and an action of taking out ozone generated in the electrostatic charger 116. The air containing ozone is taken out from the main body protrusion duct 40 to the main body air duct 30, and passes around in an L shape through the main body air duct 30 to be expelled from the air outlet port 111A on the main body left side face of the image forming apparatus 100 (see FIG. 7).

The air inlet port 110A and the air outlet port 110B of the process cartridge 110 are of rectangular shape, and one of the seal members 10 described above is adhered around the periphery of the air inlet port 110A and the air outlet port 110B. The size of each of the seal members 10 is appropriately adjusted according to the sizes of the air inlet port 110A and the air outlet port 110B.

Configuration is made such that when the process cartridge 110 is being mounted or being detached, the non-illustrated air outlet port and air inlet port of the main body protrusion ducts 40 each slide against the side face of the process cartridge 110 on the cleaning device 130 side. There are the seal members 10 configured with the curved portion 10b, adhered to the air inlet port 110A and the air outlet port 110B. Therefore catching of the end portion of the seal members 10 is suppressed even when repeatedly in receipt of a sliding frictional load against the main body protrusion duct 40 when the process cartridge 110 is being mounted or detached, enabling lifting up of the end portions of the seal member 10 to be suppressed.

EXAMPLES

Overall Configuration of a Seal Member

Figure 12:
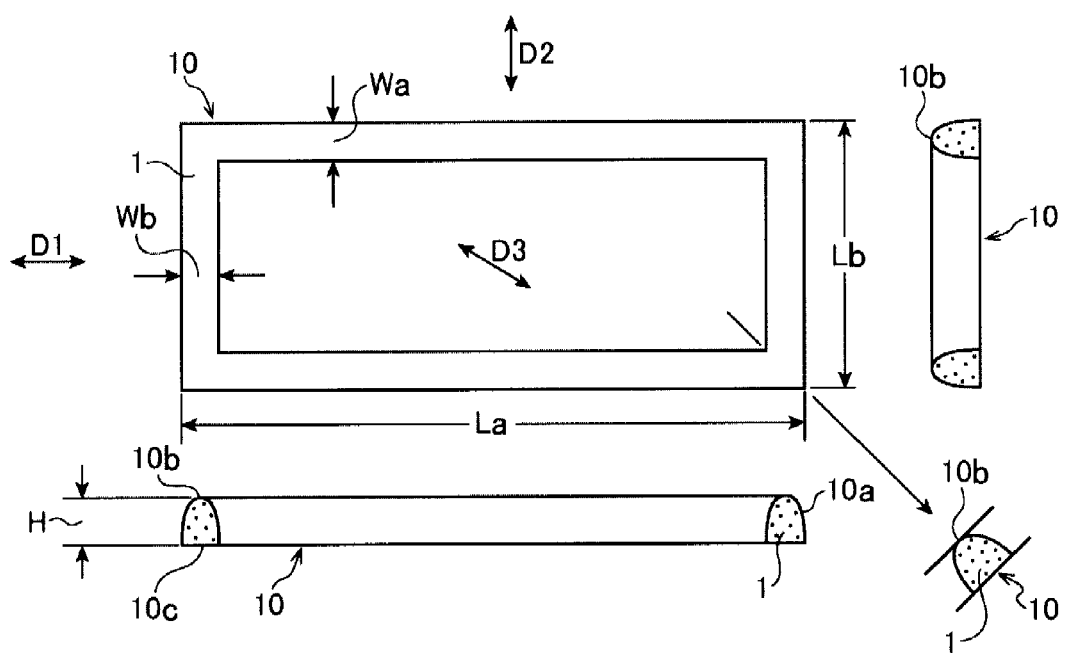
FIG. 12 is a diagram of a seal member obtained by the present invention.

FIG. 12 is of an example of the seal member 10 used in a toner storage container of the present invention. The seal member 10 is formed overall from a urethane foam by thermal compression processing, and has a longitudinal length La=59 mm, a crosswise length Lb=19 mm, a width of the longitudinal portions Wa=2 mm, a width of the crosswise portions Wb=4 mm, and a height H=4 mm. The seal member 10 is protected by a skin layer 10a, formed over the entire surface during the thermal compression processing and having a comparatively high specific gravity. The apex of the seal member 10 is formed by the gentle curved portion 10b, such that a shutter (not shown in the figures) is able to move smoothly across the top thereof. This curved portion is formed to the longitudinal portions, the crosswise portions, and the intersecting positions of the longitudinal portions and the crosswise portions of the urethane foam. Consequently the shutter is able to move smoothly when it contacts the urethane foam 1 from whichever direction (the directions $D_1$, $D_2$, $D_3$ in FIG. 12). In addition the seal member 10 can be adhered to a non-illustrated unit 5 by application of an adhesive to the unidirectional surface 10c of the seal member 10 of FIG. 12.

Mold

Figure 13:
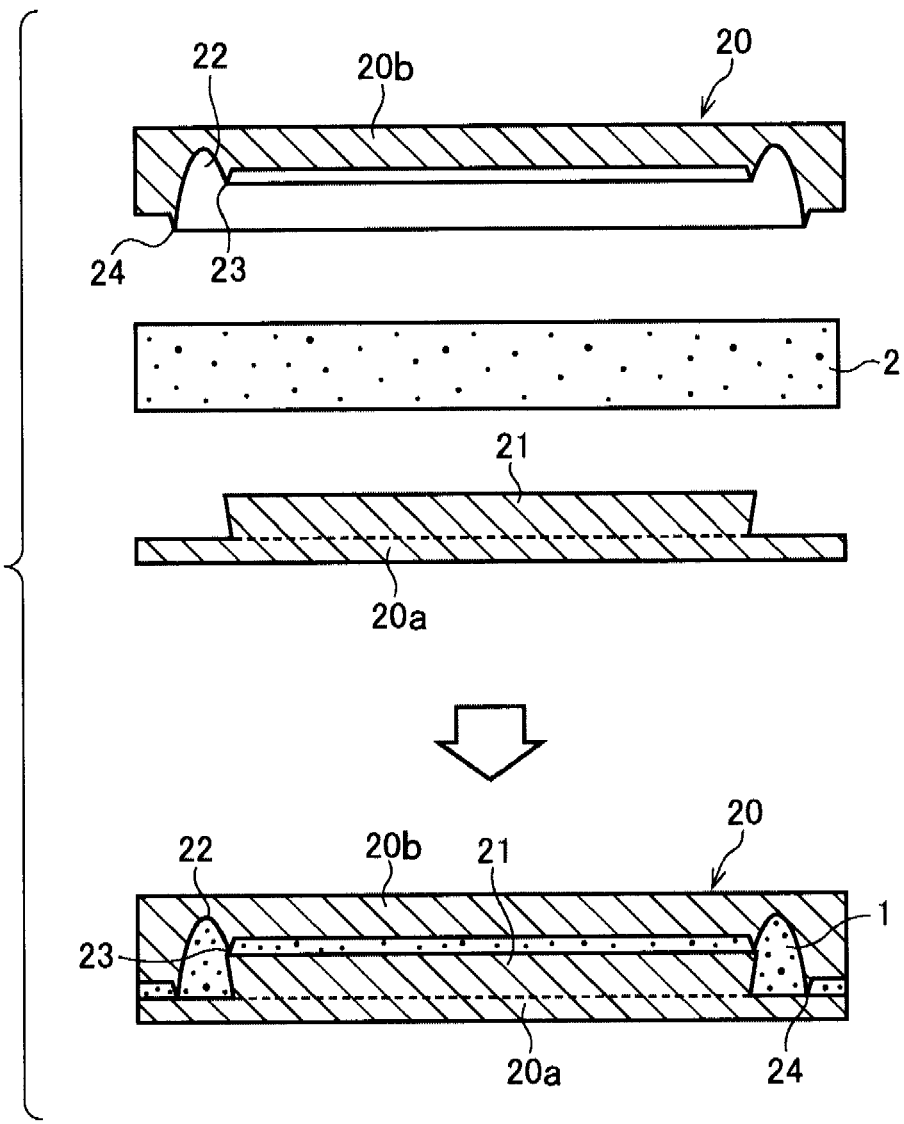
FIG. 13 is a diagram showing an example of a mold used for obtaining the seal member of the present invention.

FIG. 13 is of a mold 20 for processing heat press urethane foam 1 to obtain the above described seal member. The mold 20 is configured with a bottom mold 20a, formed with protrusion portion 21 for sectioning off to form the inner face of a ring shaped heat press urethane foam 1. A top mold 20b is formed with a hollowed out portion 22 of 3 mm depth, sectioning off to form the outer face and a curved apex surface of the ring shaped heat press urethane foam 1.

Cutter portions may be formed to part-off waste portions, and the projections 23, 24 are formed to the top mold along the respective parting lines.

Urethane Foam

The urethane foam 2 used is 0.03 in specific gravity and 5 mm in thickness.

Heat Treatment

The urethane foam 2 was squashed in the above described mold 20, and heated to 180° C. for 2 minutes, imparting a permanent deformation to the urethane foam 2. When 160° C. for 2 minutes is used for the heat treatment conditions there is sometimes insufficient permanent distortion depending on the properties of the urethane foam, with a danger that non-uniform dimensioned products may result.

Molded Body

Figure 14:
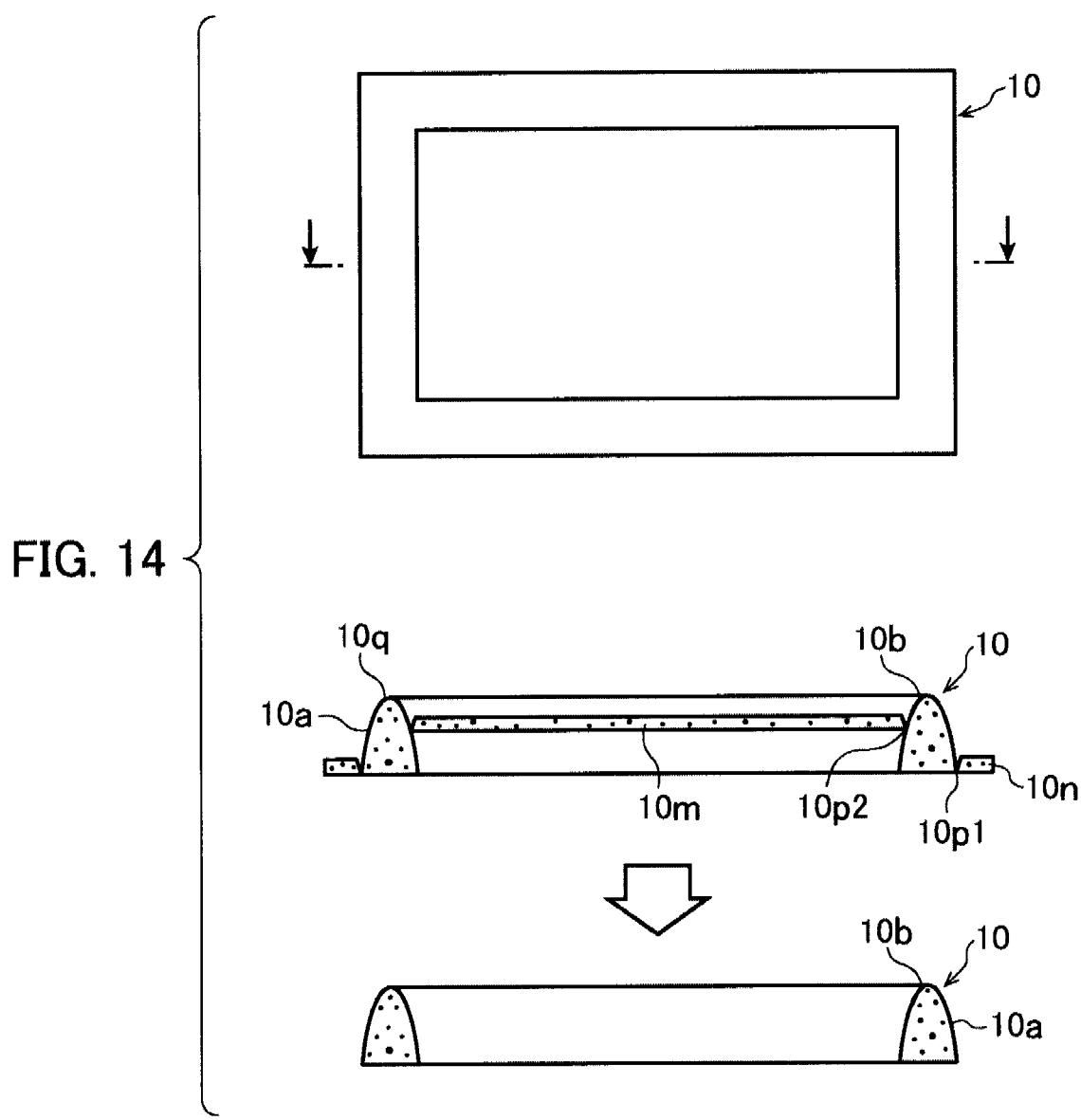
FIG. 14 is a diagram showing a molded body (seal member) obtained with the mold of FIG. 13.
Figure 15:
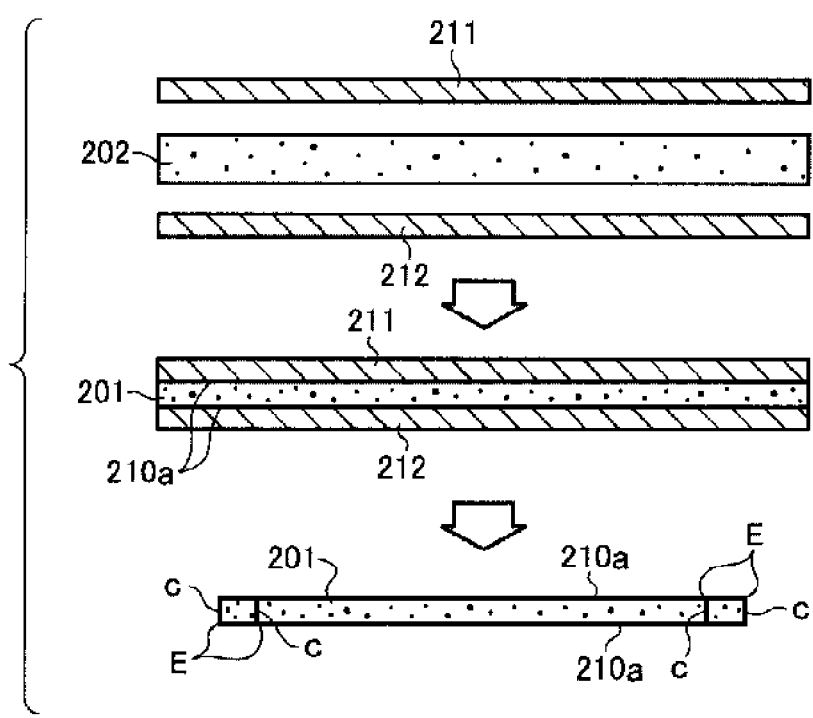
FIG. 15 is an explanatory diagram of a related seal member.
Figure 16A:
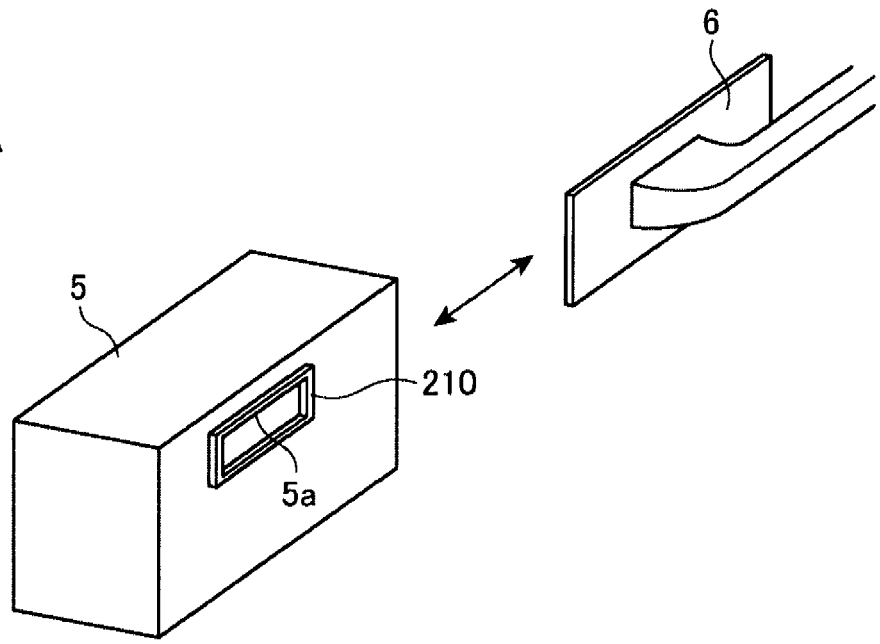
FIG. 16A is an explanatory diagram of a related seal structure.
Figure 16B:
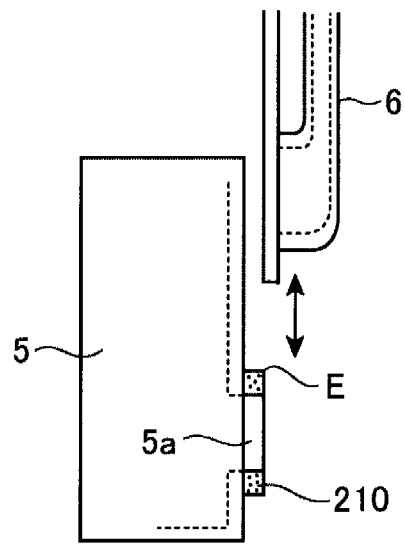
FIG. 16B is an explanatory diagram of a related seal structure.
Figure 17B:
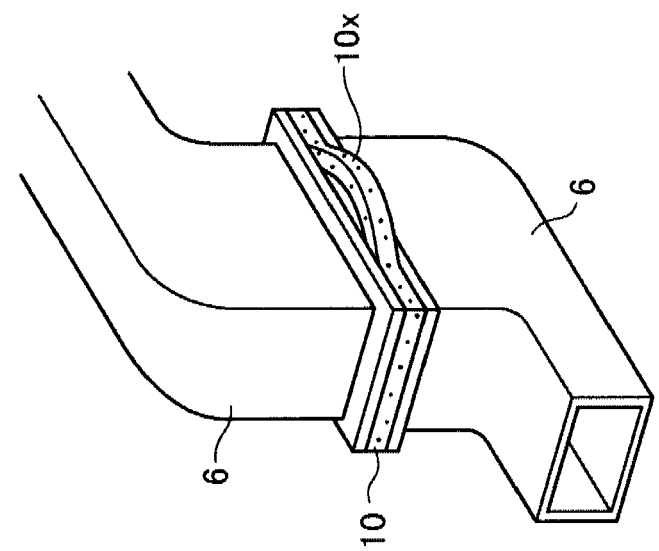
FIG. 17B is an explanatory diagram of a related seal structure.
Figure 17A:
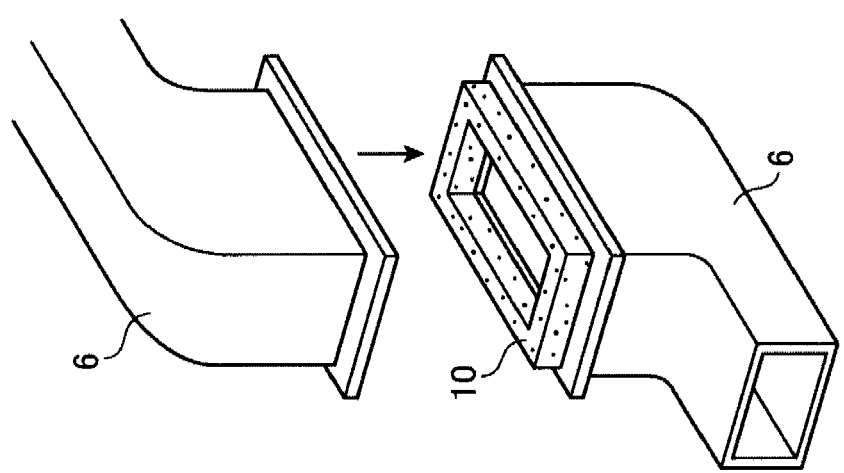
FIG. 17A is an explanatory diagram of a related seal structure.

The overall configuration of an obtained molded product is shown in FIG. 14, the maximum height thereof is 3 mm, and positions squashed in the mold 20 are compressed to configure a resin layer of a thickness of the resin layer of about 0.1 mm. These portions are readily capable of being parted by pulling at the positions where they stick out (positions 10m, 10n) due to cutter portions (10p). The molded body, namely the seal member obtained by the method of the present invention, is shaped with a thickness that is thinnest at the urethane foam end portion $10P_1$, the thickness gradually getting greater on progression away from the end portion, with the maximum thickness at the urethane foam curved portion apex point 10q. In addition permanent thermal deformation is applied to the molded body so as to form a structure in which the thickness gets thinner with distance from the curved portion apex point 10q, with a comparatively thin skin layer 10a formed on the surface due to the heat treatment, increasing the strength of the surface, and producing a body which also has good sliding against a shutter.

The present invention is as explained above, the seal structure using the obtained seal member is extremely excellent for a seal structure, with smooth rolling over of a shutter or the like, solving the defects of catching and lifting up the end portions of the seal member. In addition, by being a structure in which the thickness increases gradually with distance from the end portions, in a seal structure aligned with a separate member from a direction perpendicular to the opening portion as shown in FIG. 2, the structure is able to prevent urethane foam from sticking out due to deformation toward the inside and outside due to compression of the urethane foam.

What is claimed is:

1. A sealing member consisting of a single layer of a urethane foam member, a skin layer provided on the urethane foam member and an adhesive layer, wherein the urethane foam member is an elongated body forming a closed loop frame comprising:
    a first surface comprising the adhesive layer disposed thereon;
    and a second surface comprising an edge portion which is opposed to the first surface, wherein a width of the elongated body increases from the edge portion of the second surface to the first surface, such that the width at the edge portion of the second surface is smaller than remaining portions of the elongated body and such that a cross-section of the elongated body has a substantially D-shape, wherein the second surface comprises two opposing sides thereof having chamfered edges,
    wherein the urethane foam member consists of urethane foam,
    wherein a specific gravity of the skin layer is higher than a specific gravity of the urethane foam member apart from the skin layer,
    wherein the urethane foam is thermally compressed to form the skin layer, and
    wherein the skin layer has parting lines resulting from waste portions having been parted-off.

2. A seal structure comprising:
    a first member having a face;
    a second member; and
    the sealing member of claim 1 adhered to the face of the first member by the adhesive layer;
    wherein the second member is spaced from the first member in a direction substantially perpendicular to the face of the first member on which the sealing member is adhered, wherein the second member directly contacts with the edge portion of the second surface of the urethane foam member of the sealing member at a portion wherein a thickness of the urethane foam member is the largest, and wherein no adhesive is present between the second surface of the urethane foam member and the second member.

3. The seal structure of claim 2, wherein a space between the first member and the second member is opened and closed.

4. An air duct for use in an image forming apparatus, comprising a connecting portion with the seal structure of claim 3.

5. An image forming apparatus comprising the air duct of claim 4.

6. A process cartridge that is attachable and detachable to and from an image forming apparatus, the process cartridge comprising the seal structure of claim 3 provided to at least one of an air inlet port and/or an air outlet port.

7. An image forming apparatus comprising the process cartridge of claim 6.

8. An air duct for use in an image forming apparatus, comprising a connecting portion with the seal structure of claim 2.

9. An image forming apparatus comprising the air duct of claim 8.

10. A process cartridge that is attachable and detachable to and from an image forming apparatus, the process cartridge comprising the seal structure of claim 2 provided to at least one of an air inlet port and/or an air outlet port.

11. An image forming apparatus comprising the process cartridge of claim 10.

12. A toner storage container for storing toner therein, the toner storage container comprising:
the sealing member of claim 1 adhered to the face of the first member to surround a periphery of an outlet to allow the toner out of the toner storage container.

13. An image forming apparatus comprising the toner storage container of claim 12.

14. The sealing member of claim 1, wherein the specific gravity of the urethane foam has a value in a range between 0.02 and 0.1.

15. A seal structure comprising: a first member comprising a face; a sealing member consisting of a single layer of a urethane foam member, a skin layer provided on the urethane foam member and an adhesive layer, wherein the urethane foam member is an elongated body forming a closed loop frame comprising:
a first surface comprising the adhesive layer disposed thereon;
a second surface comprising an edge portion which is opposed to the first surface, wherein a width of the elongated body increases from the edge portion of the second surface to the first surface, such that the width at the edge portion of the second surface is smaller than remaining portions of the elongated body and such that a cross-section of the elongated body has a substantially D-shape, wherein the second surface comprises two opposing sides thereof having chamfered edges,
wherein the urethane foam member consists of urethane foam, and
wherein the sealing member is adhered to the face of the first member by the adhesive layer; and a second member spaced from the first member in a direction parallel to the face on which the urethane foam member is adhered,
wherein the second member directly contacts the edge portion of the urethane foam at a position wherein a thickness of the urethane foam is the largest,
wherein a specific gravity of the skin layer is higher than a specific gravity of the urethane foam member apart from the skin layer,
wherein the second surface of the urethane foam is thermally compressed to form the skin layer, and
wherein the skin layer has parting lines resulting from waste portions having been parted-off.

16. An air duct for use in an image forming apparatus, comprising the seal structure of claim 15, wherein the first member comprises a first duct including a connecting portion and the urethane foam is disposed on the connecting portion.

17. An image forming apparatus comprising the air duct of claim 16.

18. The seal structure of claim 15, wherein the sealing member comprises a completed thermally-compressed urethane foam member.

19. A process cartridge that is attachable and detachable to and from an image forming apparatus, the process cartridge comprising:
at least one of an air inlet port and an air outlet port; and
a sealing member consisting of a single layer of a urethane foam member, a skin layer provided on the urethane foam member and an adhesive layer, wherein the urethane foam member is an elongated body forming a closed loop frame comprising:
a first surface comprising the adhesive layer disposed thereon;
a second surface comprising an edge portion which is opposed to the first surface, wherein a width of the elongated body increases from the edge portion of the second surface to the first surface, such that the width at the edge portion of the second surface is smaller than remaining portions of the elongated body and such that a cross-section of the elongated body has a substantially D-shape, wherein the second surface comprises two opposing sides thereof having chamfered edges,
wherein the urethane foam member consists of urethane foam, and
wherein the sealing member is disposed on the at least one of the air inlet port and the air outlet port,
wherein the other one of the air inlet port and the air outlet port directly contacts the edge portion of the urethane foam at a position wherein a thickness of the urethane foam is the largest,
wherein a specific gravity of the skin layer is higher than a specific gravity of the urethane foam member apart from the skin layer,
wherein the second surface of the urethane foam is thermally compressed to form the skin layer, and
wherein the skin layer has parting lines resulting from waste portions having been parted-off.

20. An image forming apparatus comprising the process cartridge of claim 19.

21. The process cartridge of claim 19, the sealing member comprises a completed thermally-compressed urethane foam member.

* * * * *